United States Patent [19]
Tice et al.

[11] Patent Number: 5,712,548
[45] Date of Patent: Jan. 27, 1998

[54] BI-DIRECTIONAL MOTOR ACTUATOR

[75] Inventors: Bill Tice, Vista; Brian Matthew Haskell, San Marcos, both of Calif.

[73] Assignee: ETI Systems, Inc., Carlsbad, Calif.

[21] Appl. No.: 784,765

[22] Filed: Jan. 16, 1997

[51] Int. Cl.$^6$ .................. H02P 3/12; H02P 1/22
[52] U.S. Cl. .................. 318/293; 318/295; 318/375; 318/434; 318/452; 318/469
[58] Field of Search .................. 318/256, 264, 318/265, 266, 273, 275, 286, 287, 291, 293, 294, 295, 375, 379, 430, 432, 433, 434, 452, 453, 466, 467, 468, 469; 251/129.11, 129.13

[56] References Cited

U.S. PATENT DOCUMENTS

| | | | |
|---|---|---|---|
| 3,229,181 | 1/1966 | Evans . | |
| 4,527,103 | 7/1985 | Kade | 318/293 |
| 4,800,308 | 1/1989 | Tice | 310/83 |
| 4,926,101 | 5/1990 | Enomoto et al. | 318/374 |
| 4,985,666 | 1/1991 | Nakabayashi | 318/434 |
| 5,471,123 | 11/1995 | Tice | 318/373 |
| 5,488,275 | 1/1996 | Tice | 318/468 |

*Primary Examiner*—Bentsu Ro
*Attorney, Agent, or Firm*—Frank D. Gilliam; John R. Duncan

[57] ABSTRACT

A motor actuator for preventing a motor from drawing excess current for longer than a predetermined time delay period including dynamic brakes for simultaneously braking motor rotation when motor operation is terminated for any reason. Source voltage supplies an input to a voltage regulator which in turn supplies a regulated voltage to the motor. The actuator includes a comparator circuit that has one input connected to motor supplied regulated voltage and a second input connected to the source voltage with the voltage level from source voltage adjusted to a level that is equal to the regulated motor voltage level under normal motor operational loads. When the motor draws excessive current the voltages on the comparator inputs become unequal which causes the comparator to have an output voltage. An RC circuit from the comparator output to ground potential delays the comparator output voltage for a predetermined time. When the predetermined time is exceeded voltage appears on the comparator output causing a switching element, shown as a relay, to switch the motor supply voltage off and Mos Fet conducts providing rotational braking when power is removed from the motor.

10 Claims, 1 Drawing Sheet

BI-DIRECTIONAL MOTOR ACTUATOR

FIELD OF THE INVENTION

This invention is directed to improvements in the detection of excessive motor operating currents as well as dynamic breaking when motor voltage is removed for any reason. More particularly, a bi-directional motor actuator which terminates the voltage to a motor when the current drawn by the motor is above a selected level of motor current for more than a predetermined time period and to instantaneously stop motor rotation whereby motor damage caused by the excessive current in over torqued motors is prevented.

DESCRIPTION OF THE PRIOR ART

This invention is directed to a motor actuator that can be used in the field of flow-control devices, namely, motor driven valves as well as other fields of use. An electric-drive motor, usually a direct current driven motor of the reversible type is generally used. However, stepper motors and pulse motors are also used in this field. Various problems exist specifically in the motor-operated valve art.

The problems identified in prior U.S. Pat. No. 5,471,123 and U.S. Pat. No. 5,488,275 by a co-inventor of this application set forth the various problems that occur in the motor-driven control valve art. These problems include valve seat ware after prolonged use, stiction or frictional build up in the valve and motion inertia causing over shoot of selected valve open or closed positioning to regulate flow.

The two referenced Patents and others have made various improvements in the operation of motor-operated valves including improvements that help to overcome the above problems.

The present invention provides yet further improvements in overcoming the above problems and other problems related to the operation of motor-driven valves and other motor-driven devices.

SUMMARY OF THE INVENTION

The present invention comprises a motor-drive actuator for motor operating a rotatable actuated valve or the like between one extreme rotational position to a second extreme rotational position, as for example, from a fully open or fully closed valving position in either direction of rotation to a selected rotated location. The actuator further allows for the normal operating current level of the motor during rotation of a valve or the like to be established for any associated valve or load by means of a manual adjustment of the actuator while allowing the motor to draw initial excess current above normal operating current to overcome startup inertia, etc. The actuator further provides immediate motor shut off and simultaneous inertia braking when the motor current is at a level greater than operating current and exceeds a preset time span, i.e. for a time greater than the expected startup time. This feature provides motor shut off at maximum open and closed valve positions where the normal motor rotation is stalled.

The great advantage of the actuator of the present invention is that it can be used on any rotatable valve or the like regardless of valve seat ware, stiction, friction caused by misalignment in the valve stem, etc. thereby reducing down time and labor expenses in maintaining a large inventory of replacement valve actuators as well as providing an inertia brake for stopping motor rotation when motor supply voltage is terminated.

In essence there are no mechanical stops, switches or external devices required to operated as noted above. The only requirement is that the regulated voltage at motor's normal operating level be established supplying a first input to a comparator in the actuator and the second input to the comparator be provided from source voltage that supplies the regulator and is manually adjusted to a level equal to that voltage level on the first input so that they are equal and the comparator provides no voltage at its output and further providing a predetermined sufficient delay to allow for a motor over current condition for a predetermined length of time, i.e. during motor start up, until the motor reaches a normal operating current level, and if that current level is exceeded for that predetermined time motor voltage is terminated and inertia braking is actuated.

The primary object of the invention is to provide a bi-directional motor actuator that protects a motor by terminating motor operation if excessive current is drawn by the motor for longer than a predetermined time span.

Another object of this invention is to provide a motor actuator that is operable between maximum valve rotational positions regardless of valve seat ware or stiction conditions without the need of limiting switches, stops or other external means.

Another object of this invention is to provide inertia braking of motor rotation upon termination of voltage to the to allow for precise angular positioning of a valve or the like.

These and other objects of the invention will become more apparent when reading the description of the preferred embodiment along with the drawing Figure appended hereto. The scope of the protection desired by the inventors may be gleaned from a fair reading of the claims which conclude the specifications.

BRIEF DESCRIPTION OF THE DRAWING FIGURE

FIG. 1 depicts a schematic diagram of a preferred embodiment of the present invention and FIG. 2 depicts a second embodiment of the voltage regulating means for use with the FIG. 1 schematic diagram.

DESCRIPTION OF THE PREFERRED EMBODIMENT

Figure 1:
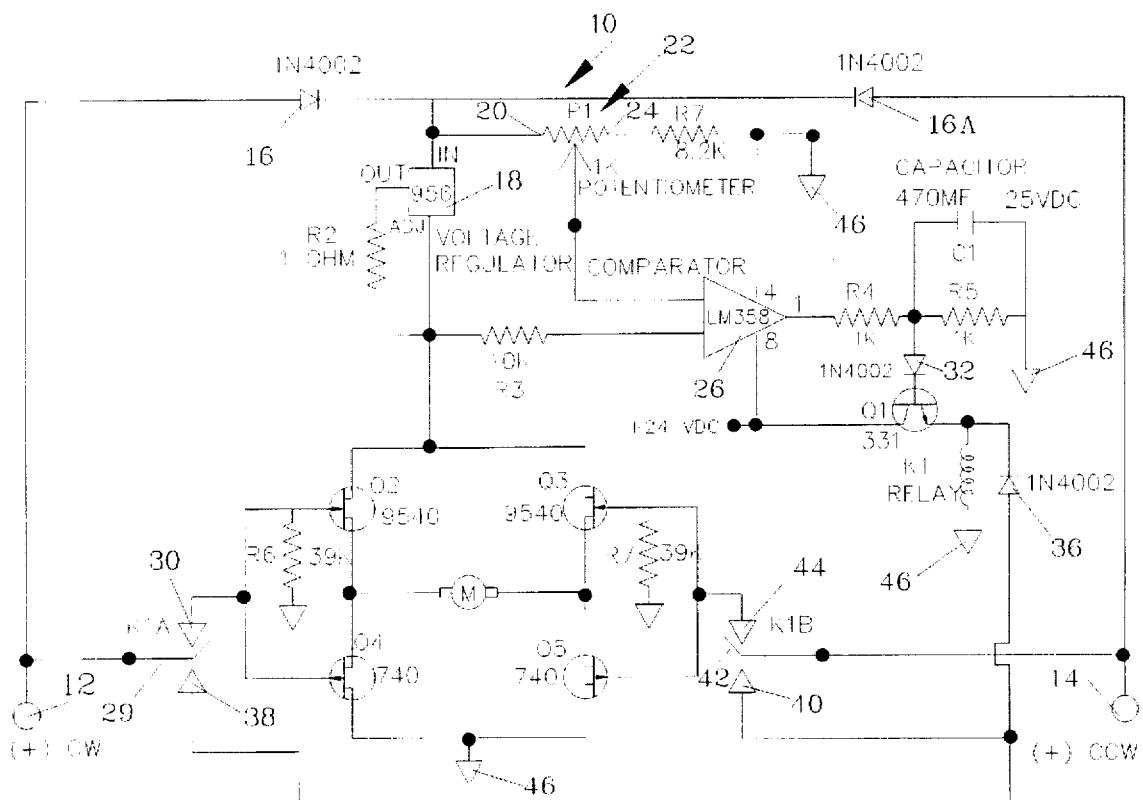

It should be understood that the preferred embodiment discussion described below is directed to a circuit suitable for use with a 24 VDC Permanent magnet motor; However, it should be understood that a similar circuit with minor adaptation having the same inventive concepts may be employed for use with AC motors, stepper motors, pulse motors, etc.

Referring now to the drawing 1 Figure which depicts the motor voltage actuator 10, a positive motor operational voltage is applied to terminal 12 for clockwise (CW) motor rotation and likewise a positive motor voltage is applied to terminal 14 for counter clock wise (CCW) motor rotation.

It should be understood that both the CW and CCW motor operation utilize the same circuit and operate in the same manner. For ease of explanation and clarity, only the CW operation of the motor will be discussed in detail.

Figure 2:
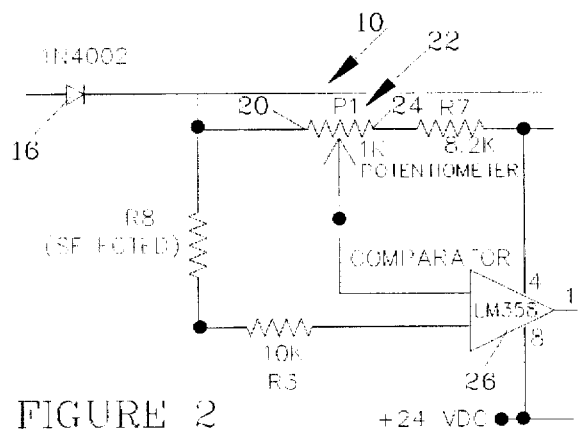

A positive voltage at a suitable motor operational level is applied to terminal 12. This voltage passes through a silicon general purpose rectifier 16 of the type 4004 or equivalent thereto. This voltage is connected to the input of voltage regulated power supply 18 of the type NTE 956 or equivalent, to the cathode of rectifier 16A which is the same electronic element as 16 where the current is blocked from passing through the rectifier 16A and is connected to one end 20 of potentiometer 22. The other end 24 of potentiometer 22 is connected through a 8.2K resister R7 to ground potential and to terminal 4 of operational amplifier (OP AMP) 26 of the type LM358 or equivalent. The wiper 28 of potentiometer 22 is connected to terminal 2 of OP AMP 26. Terminal 2 of OP AMP 26 is connected to the adjusted voltage output terminal of the voltage regulator 18 through a resister Pa of 10K ohms. It should be understood that a voltage dropping resistor R8 of a value selected to provide the necessary voltage differential on excess current drain by the motor M in the same manner as the voltage regulator 18, see drawing FIG. 2, could be used in place of the voltage regulator. A resister R2 of 1 ohm is connected between the output terminal and the adjusted output terminal of voltage regulator 18. The Adjusted voltage output of the voltage regulator is additionally connected to the drain terminals of power Mosfet-P-Channel IRE9520 Q2, Q3 manufactured by International Rectifier or an equivalent thereto. Please note that Q4, and Q5 are the same electronic element as Q2 and Q3.

The positive source voltage is also connected to the rotor 29 of relay K1A. Contact 30 of relay K1A which is connected to the gates of Mos Fets Q2 of the type 9540 or equivalent and Q4 of the type 740 or equivalent. It should be understood that any convenient switching means can be used in place of the relay K1A. A 39K ohm resister R6 is connected from relay terminal 30 to ground potential.

The output connection, terminal 1 of the Op Amp 26 is connected through resister R4 of 1K ohms to one side of capacitor C1 of 457 Micro farads, one side of resister R5 of 1K ohms and to the anode of diode 32 of the type 1N4002 or equivalent. The opposite terminals of R5 and C1 are connected to ground potential. The cathode of diode 32 is connected to he base element an NPN Silicon Audio Power Amp switch of the type 331 or equivalent.

Terminal 8 of Op Amp 26 and the collector of Q1 are connected to a 24 Volts DC source. The emitter of Q1 is connected to one end of the actuation coil of relay K1. and to the cathode of a diode 36 of the type 1N4002 or equivalent. The anode of diode 36 is connected to terminals 38 of relay section K1A and to terminal 40 of relay section K1B.

The source element of Q2 is connected to the drain element of Q4 and to one side of the motor to provide operational voltage. The opposite motor voltage connection is connected to the source of Q3 and to the drain element of Q5. The motor connections either provide voltage to the motor or a ground depending on the operation of the control circuit herein after discussed. The source element of Q4 and Q5 are connected to ground potential.

Referring the top portion of the Drawing, the anode of diode 16A is connected to (+) CCW terminal and to the rotor element 42 of relay section K1B. Contact 44 of relay section K1B is connected to the gate of Q3, to the drain of Q5 and to one end of resister R7 of 39K ohms.

The control unit 10 is a motor hi-directional rotation actuator with a preferred purpose of operating motors which drive rotating devices such as, for example, and not by of limitation rotatable valves which are driven through suitable gear reduction devices as taught by U.S. Pat. No. 4,800,308 by a co-inventor of the present invention and others known in the art.

In operation, a positive voltage is applied to either the (+) Cw or (+) CCW terminals and ground depending the desired rotational direction of the motor. In the following example a (+) voltage of a suitable voltage level with the required current capabilities is applied to the (+) CW terminal and the negative to ground indicated by terminals 46. When opposite rotation is desired the (+) is removed from terminal 12 and applied to terminal 14 (+) CCW by any convenient means known in the art. The ground connection remains connected to terminals 46.

As noted above only the CW operation of the motor will discussed in detail as the operation of CCW is identical.

A suitable supply voltage is applied to terminal 12 by a suitable switching means, not shown. Voltage supplied to the motor is regulated by voltage regulator 18 and R2. Relay terminals 29 and 30 are normally in contact, i.e. the relay is a normally closed in the 29 to 30 contacting position. The voltage applied to Q2 turns Q2 off and turns on Q4 causing voltage to be applied and current to flow through the motor to ground operating the motor in a CW direction of rotation. Resistor R6 causes Q2 to be turned on when voltage is removed from terminal 12 thereby providing dynamic braking to motor rotation in the CW direction.

When the torque demand on the motor during start up causes motor current demand to elevate from a normal operating current, the voltage across the voltage regulator 18 will increase. When the voltage present on terminal 2 of Op Amp 26 drops below the voltage setting on terminal 3 of Op Amp 26 supplied from wiper 28 of P1 an output voltage is present on terminal 1 of Op Amp 26. If the predetermined delay by RC circuit C1 and R5 is not exceeded prior to the current drain returning to normal the motor operation will not terminate; However, if after the predetermined delay of the RC circuit C1 and R5 the current does not lower, as for example, when the valve is at either rotational limit or is jammed for any reason, the output voltage now present on the output of the comparator turns on Q1 tripping relay K1A. The actuation of relay K1A removes the voltage from terminal 30 switching off the motor and energizes Q2 stopping motor rotation. The normally closed relay K1A will remain in an open state until voltage is removed from terminal 12.

For CCW rotation all functions are identical except the direction of motor rotation.

For any given operation of the bi-directional motor actuator, the normal current requirements of the motor to overcome rotational torque is established by the voltage level present on terminal 2 of Op Amp 26 during normal valve rotation, i.e. between open and closed positions. P1 is then adjusted to that level of terminal 2 to maintain a zero output from the Op Amp 26 under normal expected operation.

It is well known that initial motor start up under load requires more that normal operating current due to stiction, etc., to accommodate this excess start up current and to not terminate motor operation when a voltage level difference occurs the Op Amp 26 output terminal 1 is connected to an RC circuit consisting of capacitor C1 and resister R5 connected to terminal 1 of the Op Amp to remove any output voltage level from terminal 1 for a sufficient time required for the current to reduce to its normal operation level. The value of the capacitor C1 is shown as 470 Micro Farad and R5 of 1K ohm for a specific time delay for a specific output level from terminal 1 of Op Amp 26. It should be understood that the value of the capacitor C1 and R5 are selected for the time delay required for a specific motor under load start up torque.

When a valve is rotated to either extreme positions, i.e. fully closed (seated) or fully open, the motor is caused to stop rotating. When this occurs the predetermined time for the motor drawing excess current is exceeded and the motor voltage will be switched off. This feature allows for the actuator of this invention to be used with new or used valves regardless of seat ware, resistance of rotation or number of turns between fully open and seated states.

As set out above, the motor actuator of this invention is specifically useful for rotational operation of reversibly operated valves between their full-open and full-closed positions.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of circuitry and method steps may be resorted without departing from the spirit and scope of the invention.

What is claimed is:

1. A bi-directional motor actuator for terminating operational voltage to a motor when established voltage levels change due to increased motor current levels and dynamic braking for instantaneously stopping motor rotation when motor voltage is terminated comprising:

a voltage source;
   a voltage regulator means having an input voltage from said voltage source and an voltage output for supplying operational voltage to said motor;
   a comparator means having a first and second input and an output, said first input being connected to said voltage source and said second input being connected to the output of said voltage regulator means, said first input being adjusted to the voltage level of said second input while the motor is operating under normal operating loads by voltage adjustment means, said comparator having no output voltage when the voltages on said first and second inputs are equal and providing an output voltage when said first and second inputs are unequal; and
   switching means connected to and controlled by the comparator output voltage for terminating voltage from said voltage regulator means to said motor when an output voltage from said comparator is detected by said switching means.

2. The invention as defined in claim 1 wherein said regulator means is a voltage regulated power supply.

3. The invention as defined in claim 1 wherein said voltage regulator means is a resistor of selected value.

4. The invention as defined in claim 1 further comprises manual voltage adjustment means in series between said voltage source and said first input to said voltage regulator means for adjusting the input voltage level of said voltage source on said first input substantially equal to the regulated voltage on the second input.

5. The invention as defined in claim 4 wherein said voltage adjustment means is a voltage divider.

6. The invention as defined in claim 1 wherein said voltage divider is a potentiometer.

7. The invention as defined in claim 1 wherein said switching means is a normally closed relay which is caused to open when an output voltage from said comparator means is detected said relay.

8. The invention as defined in claim 1 additionally comprising means for delaying operation of said switching means for a preselected length of time after said comparator means has an output voltage.

9. The invention as defined in claim 8 wherein said means for delaying the operation of said switching means is an RC circuit of a selected capacitance and resistance value.

10. The invention as defined in claim 1 additionally comprising a means for dynamically stopping motor rotation when said switching means removes voltage from said motor.

* * * * *